US012755899B2

(12) United States Patent
Ebert et al.

(10) Patent No.: US 12,755,899 B2
(45) Date of Patent: Oct. 6, 2026

(54) WIRE-COIL PROVIDING DEVICE FOR MOVING A PLURALITY OF WIRE COILS DURING THE PRODUCTION OF COIL WINDINGS

(71) Applicant: ZF FRIEDRICHSHAFEN AG, Friedrichshafen (DE)

(72) Inventors: Matthias Ebert, Himmelstadt (DE); Ralf Schneider, Werneck (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 138 days.

(21) Appl. No.: 18/865,793

(22) PCT Filed: May 11, 2023

(86) PCT No.: PCT/EP2023/062610
§ 371 (c)(1),
(2) Date: Nov. 14, 2024

(87) PCT Pub. No.: WO2023/222507
PCT Pub. Date: Nov. 23, 2023

(65) Prior Publication Data

US 2026/0188573 A1 Jul. 2, 2026

(30) Foreign Application Priority Data

May 17, 2022 (DE) ..................... 10 2022 204 825.3

(51) Int. Cl.
*H01F 41/09* (2016.01)
*H01F 41/082* (2016.01)
(Continued)

(52) U.S. Cl.
CPC ........... *H01F 41/09* (2016.01); *H01F 41/082* (2016.01); *H02K 15/085* (2013.01); *H02K 15/09* (2013.01)

(58) Field of Classification Search
CPC ........ H01F 41/09; H01F 41/082; H01F 41/07; H01F 41/06; H01F 41/69; H02F 15/085; H02F 15/09
(Continued)

(56) References Cited

U.S. PATENT DOCUMENTS

| | | | |
|---|---|---|---|
| 8,122,593 | B2 | 2/2012 | Gorohata et al. |
| 2010/0077599 | A1 | 4/2010 | Tokizawa |
| 2015/0287504 | A1 | 10/2015 | Clelland et al. |

FOREIGN PATENT DOCUMENTS

| | | | |
|---|---|---|---|
| CN | 203219142 | 9/2013 | |
| CN | 115362622 A * | 11/2022 | ........... H01F 41/088 |

(Continued)

OTHER PUBLICATIONS

Kr202400152445 (Year: 2024).*
(Continued)

*Primary Examiner* — Gene O Crawford
*Assistant Examiner* — Lester Rushin, III
(74) *Attorney, Agent, or Firm* — COZEN O'CONNOR

(57) ABSTRACT

A wire coil providing device for moving a plurality of wire coils during the production of coil windings comprises at least two belts with guide rails, a coil carrier being arrangeable at each of the guide rails, and with connection rails which are arranged between the two belts and on which a coil carrier is displaceable between the guide rails of the belts, and further includes at least one parking rail on which the coil carrier is slidable from the guide rail so that a further coil carrier arranged in a further guide rail is slidable past it.

10 Claims, 5 Drawing Sheets

(51) Int. Cl.
*H02K 15/085* (2006.01)
*H02K 15/09* (2006.01)

(58) Field of Classification Search
USPC ................................................ 198/418, 418.8
See application file for complete search history.

(56) References Cited

FOREIGN PATENT DOCUMENTS

| | | | | |
|---|---|---|---|---|
| DE | 14199082 | | 3/1970 | |
| DE | 10158267 | | 6/2003 | |
| EP | 0314899 | | 5/1989 | |
| EP | 1366558 | | 8/2011 | |
| JP | 2002027693 | | 1/2002 | |
| JP | 2004152656 | | 5/2004 | |
| JP | 2009195032 | | 8/2009 | |
| SI | 2732454 | T1 * | 3/2017 | ........... H02K 15/095 |
| WO | WO 2022017970 | | 1/2022 | |

OTHER PUBLICATIONS

JP 2024144081 (Year: 2024).*
SI 2583373 T1 (Year: 2018).*
Office Action of corresponding German Patent Application No. DE 10 2022 204 825.3, dated Apr. 20, 2023.

* cited by examiner

WIRE-COIL PROVIDING DEVICE FOR MOVING A PLURALITY OF WIRE COILS DURING THE PRODUCTION OF COIL WINDINGS

CROSS REFERENCE TO RELATED APPLICATIONS

This is a U.S. national stage of Application No. PCT/EP2023/062610 filed May 11, 2023. Priority is claimed on German Application No. DE 10 2022 204 825.3 filed May 17, 2022 the content of which is incorporated herein by reference.

BACKGROUND OF THE INVENTION

1. Field of the Invention

The disclosure is directed to a wire coil providing device for moving a plurality of wire coils during the production of coil windings.

The disclosure pertains to the technical field of the production of coil windings for stators and rotors for the production of electric motors. For this purpose, a plurality of wires are wound to form a coil mat.

2. Description of the Related Art

The word “stator” derives from the Latin word stare meaning to stand. The immobile part of an electric motor is designated as stator. The rotating part of an electric motor is designated as rotor or armature.

In general, the rotor comprises a motor shaft, the armature, which is made of sheet iron, an armature coil with various windings, and a slip ring for transmitting current.

Meanwhile, there are different types of electric motors. Probably the most important difference between the individual types consists in the power supply. In this respect, it is already determined at the design stage whether the motor should be fed with direct current, alternating current, or three-phase current.

The required magnetic fields are also produced in different ways in the respective motors. Aside from strong permanent magnets, electromagnets are also employed depending on the intended use. In the simplest case, a coil of copper wire is wrapped around an iron core of sheet metal plates to generate the required magnetic field.

The winding technique substantially determines the characteristics of electromechanical assemblies with windings, such as stators and rotors. These characteristics include insulation strength, the Q factor, the magnitude required for a particular output or magnetic force, or the magnetic stray field.

In the known methods for producing coil windings for stators and rotors, the wires are fed in parallel to the winding machine. During the winding process, the wires are crossed over and a phase jump occurs. For crossing the wires, a first wire is placed in the groove of a second wire and the second wire is placed in the groove of the first wire.

The quantity of phase jumps within a winding is limited. At a phase jump, the wires are moved out of their original position and stressed diagonally. Further, the wires rub against one another. This may result in damage to the insulation on the wires and, therefore, to process disruptions. Further, there is no reliable control of the wire path of the individual wire coils through the large number of wire movements through the braking and pulling of the wire.

SUMMARY OF THE INVENTION

An object of one aspect of the invention is to provide a wire coil providing device that overcomes the drawbacks of the prior art and which makes it possible to produce coil windings with a reduced quantity of phase jumps. One Aspect of the invention provides a method for producing coil windings that overcomes the drawbacks of the prior art and which allows the wire movements within the winding process to be reduced.

The above-stated object is met by a wire coil providing device for moving a plurality of wire coils during the production of coil windings having the features of the independent claims. Advantageous embodiment forms are the subject matter of the associated subclaims.

One aspect of the invention comprises a wire coil providing device for moving a plurality of wire coils during the production of coil windings, comprising at least two belts with guide rails. A coil carrier is arrangeable at each of the guide rails. Connection rails are arranged between the two belts, and a coil carrier is displaceable between the guide rails of the belts on the connection rails. The wire coil providing device further comprises at least one parking rail on which the coil carrier is slidable from the guide rail so that a further coil carrier arranged in a further guide rail is slidable past it. This enables the coil carriers to pass one another and, accordingly, the wires need not be fed across one another in the winding process.

In an advantageous aspect, the connection rails are arranged perpendicular to the belts. This enables the coil carriers to be transferred between the two belts.

It is particularly advantageous when the two belts with guide rails are arranged parallel to one another. In so doing, the coil carriers can easily be displaced between guide rails and connection rails at different positions.

According to a preferred aspect, the two belts with guide rails are arranged at a predetermined angle relative to one another. This enables a compact construction.

According to an advantageous aspect, the two belts with guide rails are arranged on a carrier unit. This carrier unit comprises a drive which is formed to move the carrier unit from a horizontal position into a diagonal position. Accordingly, a plurality of coil carriers can be arranged in a plane so as to economize on space and can be optimally oriented to the winding process through the diagonal position.

At least two carrier units are advantageously radially pivotally arranged at a pivot point. This enables a plurality of carrier units to be arranged circularly as a wire coil sliding rack.

It has proven advantageous that the wire coil providing device further comprises a coil carrier. The coil carrier comprises rollers so as to be rollable along the connection rails and along the parking rail. The coil carrier is accordingly displaceable in a simple manner along the connection rails and along the parking rail and can be passed by further coil carriers.

According to a preferred aspect, a wire coil is arranged on the coil carrier. The wire coil comprises a wire guiding portion which is configured to feed a wire to a wire winding unit. This enables the wire to be wound without phase jumps in a coil winding.

It is provided in an advantageous aspect that the wire guiding portion comprises an aligning unit for aligning the wire guiding portion with a wire winding unit and a wire braking unit for controlling the speed of the wire. This enables a smooth running of the wire and makes the winding process reliably controllable on the whole.

The invention further comprises a method for producing coil windings at stators and/or rotors, comprising:

providing a wire coil providing device;

shifting the first coil carrier from the guide rail to the parking rail;

displacing the second coil carrier along the guide rail such that the first coil carrier is passed by the second coil carrier; and shifting the first coil carrier from the parking rail to the guide rail.

Due to the fact that the coil carriers can pass one another, it is possible to produce coil windings with a reduced quantity of phase jumps.

BRIEF DESCRIPTION OF THE DRAWINGS

The invention will be described in more detail in the following through embodiment examples referring to drawings. The drawings show.

DETAILED DESCRIPTION OF THE PRESENTLY PREFERRED EMBODIMENTS

Figure 1:
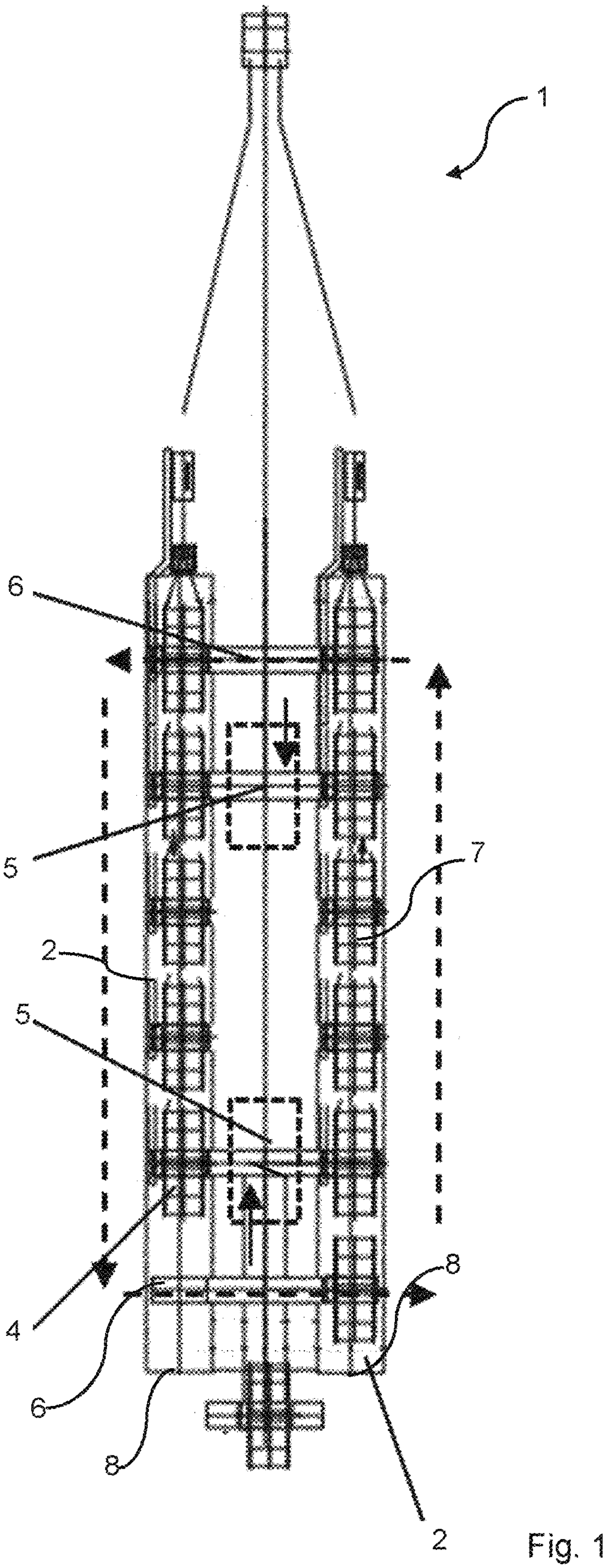
FIG. 1 is a top view of a wire coil providing device having two parallel belts.

FIG. 1 shows a top view of a wire coil providing device 1 according to one aspect of the invention with two parallel belts 8. The wire coil providing device 1 for moving a plurality of wire coils 7 during the production of coil windings comprises at least two belts 8 with guide rails 2. A coil carrier 4 is arrangeable at each of the guide rails 2. Connection rails 6 are arranged between the two belts 8. A coil carrier 4 is displaceable between the guide rails 2 of the belts 8 on the connection rails 6. The wire coil providing device 1 further comprises at least one parking rail 5 on which the coil carrier 4 is displaceable from the guide rail 2 so that a further coil carrier 4 arranged in a further guide rail 2 is slidable past it.

The connection rails 6 are arranged perpendicular to the guide rails 2. The two belts 8 with guide rails 2 are arranged parallel to one another.

FIG. 1 further shows a method for the production of coil windings on stators and/or rotors, comprising the following steps:

providing a wire coil providing device 1;

shifting the first coil carrier 4 from the guide rail 2 to the parking rail 5;

displacing the second coil carrier 4 along the guide rail 2 such that the first coil carrier 4 is passed by the second coil carrier 4; and shifting the first coil carrier 4 from the parking rail 5 to the guide rail 2.

Figure 2:
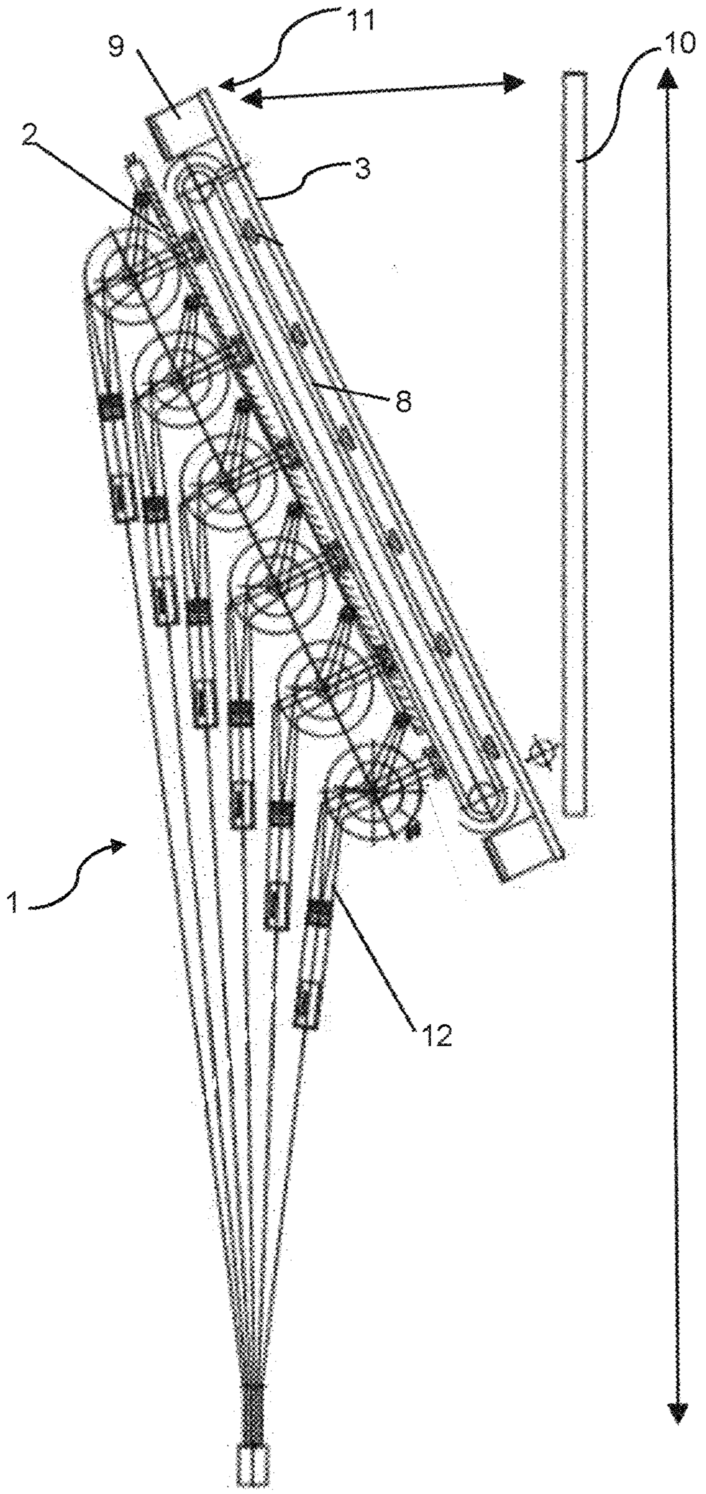
FIG. 2 is a side view of a wire coil providing device moved from a horizontal position into a diagonal position.

FIG. 2 shows a side view of a wire coil providing device 1 according to one aspect of the invention moved from a horizontal position 10 into a diagonal position 11. The two belts 8 with guide rails 2 are arranged on a carrier unit 3. The carrier unit 3 comprises a drive 9 which is formed to shift the carrier unit 3 from a horizontal position 10 into a diagonal position 11.

The wire guiding portion 12 is radially pivotally arranged.

Figure 3:
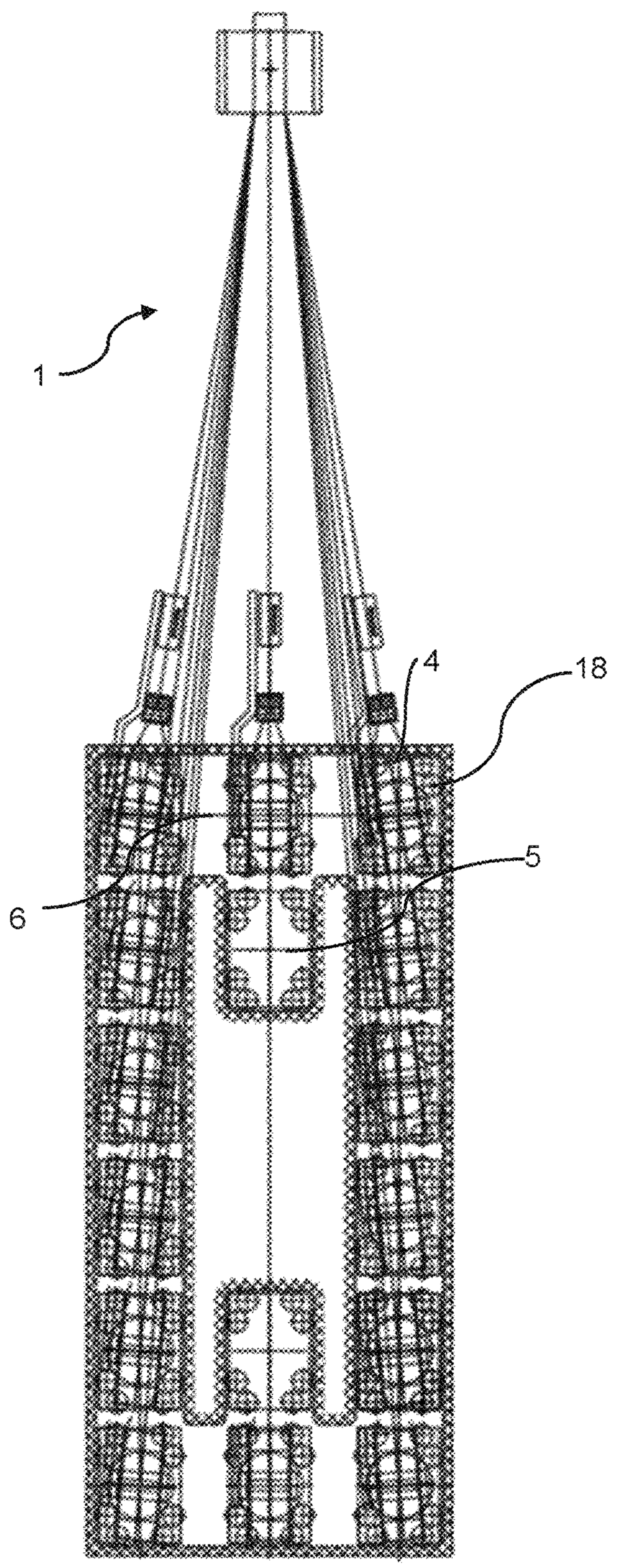
FIG. 3 is a top view of a wire coil providing device with coil carriers having rollers.

FIG. 3 shows a top view of a wire coil providing device 1 according to the invention with coil carriers 4 with rollers 18. The coil carrier 4 comprises rollers 18 so as to be rollable along the connection rails 6 and along the parking rail 5. It is also contemplated that the coil carrier 4 is rotatably mounted.

Figure 4:
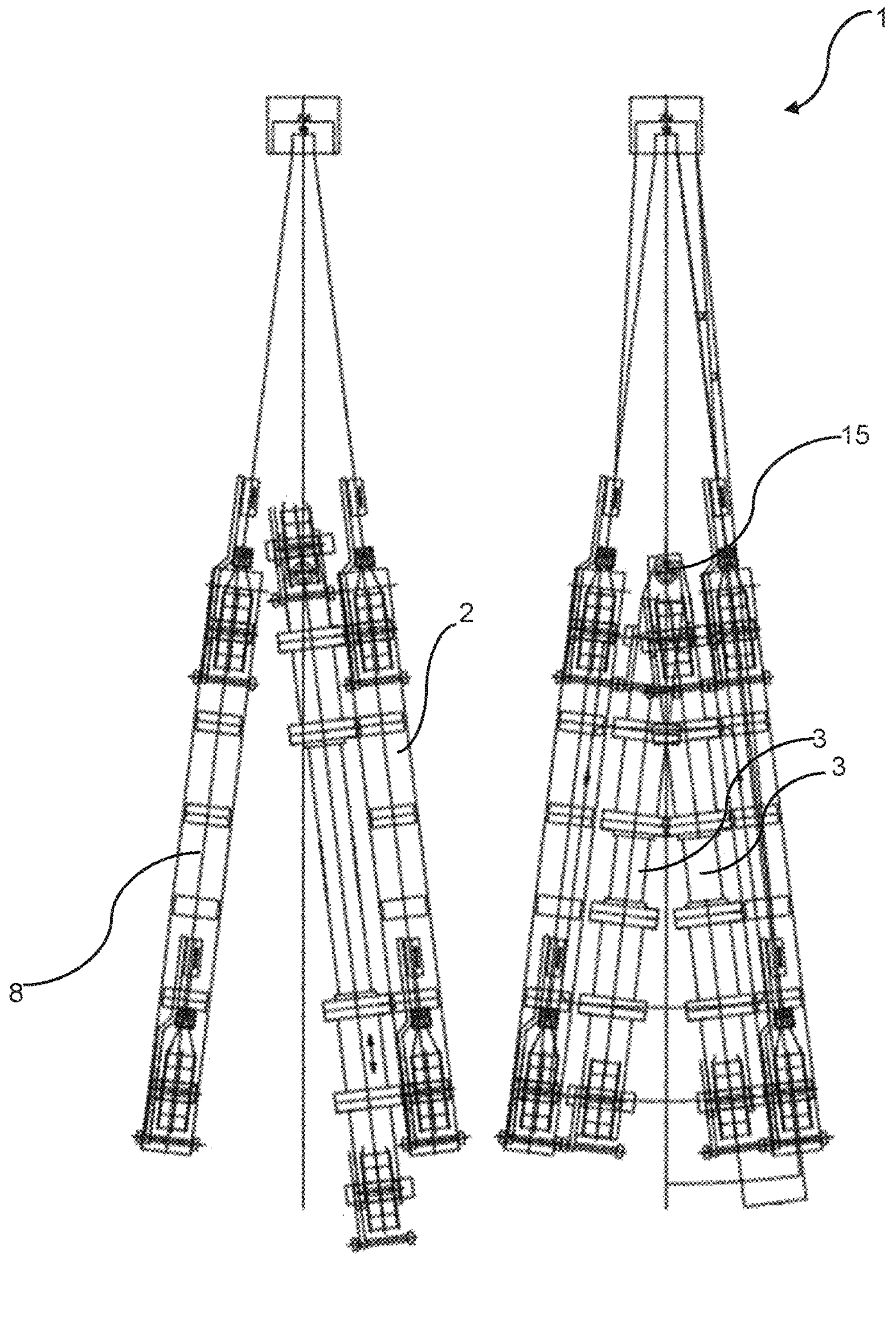
FIG. 4 is a top view of a wire coil providing device with carrier units arranged in a V shape.

FIG. 4 shows a top view of a wire coil providing device 1 according to the invention with carrier units 3 arranged in a V-shaped manner. It will be apparent that the two belts 8 with guide rails 2 are arranged at a predetermined angle relative to one another.

FIG. 4 further shows that at least two carrier units 3 are radially pivotally arranged at a pivot point 15.

Figure 5:
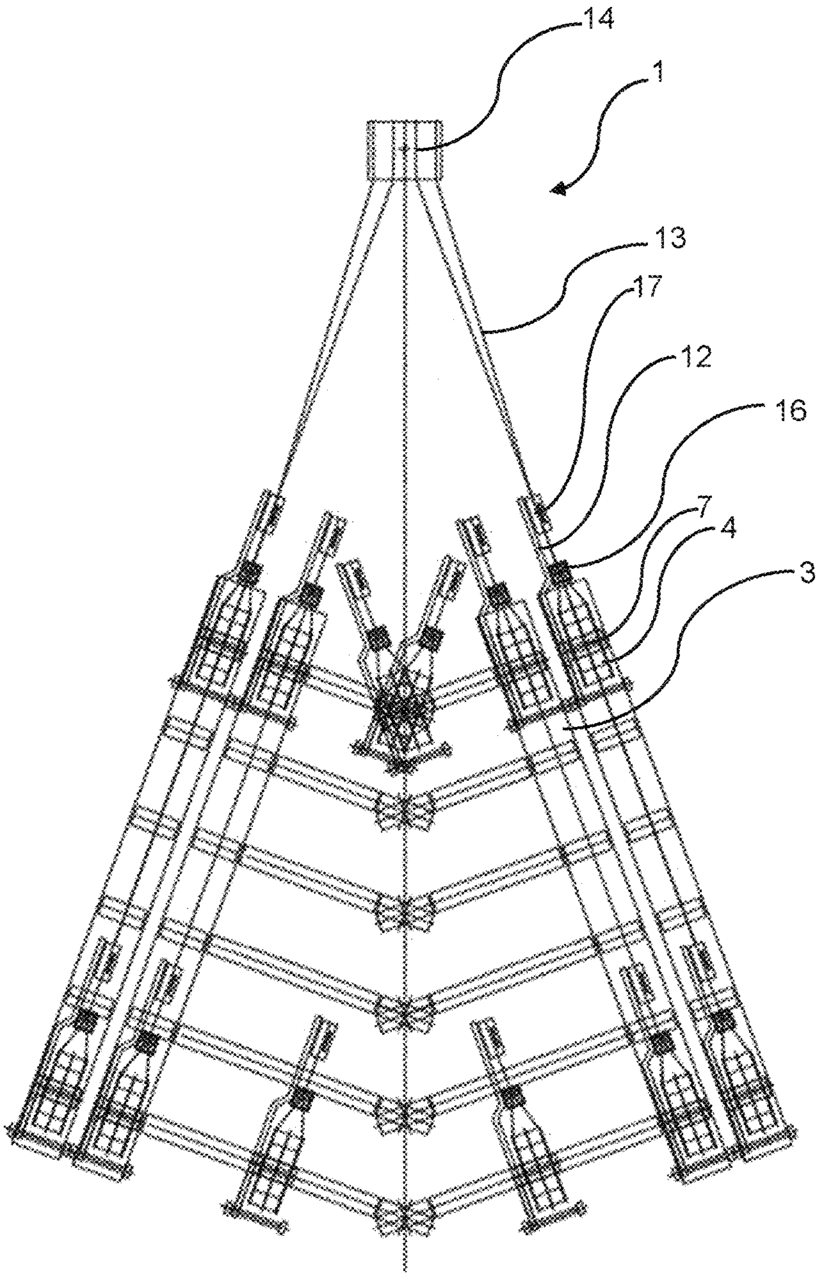
FIG. 5 is a top view of a wire coil providing device with carrier units arranged in a V shape and rotatably mounted coil carriers.

FIG. 5 shows a wire coil providing device 1 according to the invention with carrier units 3 arranged in a V-shaped manner and rotatably mounted coil carriers 4. A wire coil 7 is arranged on the coil carrier 4. The wire coil 7 comprises a wire guiding portion 12 which is formed to feed a wire 13 to a wire winding unit 14.

The wire guiding portion 12 comprises an aligning unit 16 for aligning the wire guiding portion 12 with a wire winding unit 14. The wire guiding portion 12 further comprises a wire braking unit 17 for controlling the speed of the wire 13.

It is particularly advantageous that at least two, preferably a plurality of, wire coil providing devices 1 are combined in a wire processing machine. A wire processing machine serves, for example, for the production of coil windings for stators and rotors for the production of electric motors.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A wire coil providing device configured to move a plurality of wire coils during production of coil windings, comprising:

at least two belts with guide rails;

a coil carrier being arrangeable at each of the guide rails;

connection rails which are arranged between the two belts and on which the coil carrier is displaceable between the guide rails of the belts; and at least one parking rail on which the coil carrier is slidable from a respective guide rail so that a further coil carrier arranged in a further guide rail is slidable past it.

2. The wire coil providing device according to claim 1, wherein the connection rails are arranged perpendicular to the at least two belts.

3. The wire coil providing device according to claim 1, wherein the two belts with guide rails are arranged parallel to one another.

4. The wire coil providing device according to claim 1, wherein the two belts with guide rails are arranged at a predetermined angle relative to one another.

5. The wire coil providing device according to claim 1, wherein the two belts with guide rails are arranged on a carrier unit comprising a drive that moves the carrier unit from a horizontal position into a diagonal position.

6. The wire coil providing device according to claim 1, wherein at least two carrier units are radially pivotally arranged at a pivot point.

7. The wire coil providing device according to claim 1, wherein the coil carrier comprises rollers so as to be rollable along the connection rails and along the parking rail.

8. The wire coil providing device according to claim 7, wherein a wire coil is arranged on the coil carrier, the wire coil comprises a wire guiding portion which is configured to feed a wire to a wire winding unit.

9. The wire coil providing device according to claim 8, wherein the wire guiding portion comprises an aligning unit configured to align the wire guiding portion with a wire winding unit and a wire braking unit configured to control a speed of the wire.

10. A method for producing coil windings at stators and/or rotors, comprising:

providing a wire coil providing device comprising:

at least two belts with guide rails;

a coil carrier being arrangeable at each of the guide rails;

connection rails which are arranged between the two belts and on which the coil carrier is displaceable between the guide rails of the belts; and at least one parking rail on which the coil carrier is slidable from the guide rail so that a further coil carrier arranged in a further guide rail is slidable past it;

shifting a first coil carrier from the guide rail to the parking rail;

displacing a second coil carrier along the guide rail such that the first coil carrier is passed by the second coil carrier; and shifting the first coil carrier from the parking rail to the guide rail.

* * * * *